Aug. 3, 1965   W. A. MILLER   3,199,104
DISTANCE MEASURING SYSTEM WITH DIRECT BINARY READOUT
Filed May 18, 1962                                   3 Sheets-Sheet 1

REFERENCE RANGE BIT SIGNAL

DELAYED (RECEIVED) RANGE BIT SIGNALS

DELAYED (RECEIVED) RANGE BIT SIGNALS

⊓_=0        ⊔_=1

| FIG. 1A Tx | FIG. 1B Rx | DIFF. | FIG. 1C | DIFF. |
|---|---|---|---|---|
| $t_1$ = 0010 | 0000 | 2 | 1010 | 8 |
| $t_2$ = 1001 | 0111 | 2 | 0001 | 8 |
| $t_3$ = 0100 | 0010 | 2 | 1100 | 8 |

INVENTOR.
WILLIAM A. MILLER
BY Darby & Darby
ATTORNEYS

United States Patent Office 3,199,104
Patented Aug. 3, 1965

3,199,104
DISTANCE MEASURING SYSTEM WITH DIRECT BINARY READOUT
William A. Miller, Suffolk County, N.Y., assignor to Fairchild Stratos Corporation, Hagerstown, Md., a corporation of Maryland
Filed May 18, 1962, Ser. No. 195,849
16 Claims. (Cl. 343—12)

This invention relates to distance measuring systems and more particularly to a system in which the range between a measuring station and a remote point is read out at the station directly as a binary number.

In the prior co-pending application of Roy W. Spacie, Serial No. 195,848, filed May 18, 1962, now abandoned, which is assigned to the same assignee, a system is described in which range between a measuring station and a remote point is read out directly as a binary number. In that system a plurality of subcarrier signals of different frequencies are transmitted by the station to the remote point and then received, after reflection or retransmission, back at the station to determine range. The subcarriers are uniquely related in that the frequency of each is twice that of the next lowest frequency subcarrier, that is, the subcarriers are binary related by powers of the number two. A determination is made at the receiver to see whether the received subcarriers when compared with the corresponding transmitted subcarriers fall within one of two ranges of phase shift. Depending upon which range is determined for each subcarrier, a binary 1 or 0 digit is produced and all of the binary digits taken together form a binary number. Each digit of the binary number locates the remote point within a range segment equal to one-quarter wavelength of the frequency of the subcarrier represented by the digit and the complete binary number definitively and unambiguously locates the remote point within a quarter wavelength range segment of the highest frequency transmitted subcarrier. Stated another way, the binary digit representative of the lowest frequency subcarrier phase shift range locates the remote point within the first or second half of the overall range of the system; the binary digit representing the next highest frequency subcarrier taken with the other digit locates the remote point within one-half of the first or second half, or within a range segment equal to one-quarter of the overall range of the system; the binary digit of the next higher frequency subcarrier when taken with the first two, places the within point within a range segment equal to one-eighth of the overall range; etc.

In order to produce each binary digit in the aforesaid system, it is necessary to determine within which phase shift range the received subcarrier signals lie when compared with the transmitted subcarriers of the same frequency. While the phase shift range determination can be made with relative ease since relatively little precision is required in determining one of two ranges of phase shift, it is still necessary to provide some sort of a phase determining device and then an additional device to convert the phase shift range determination into a binary signal.

The present invention is also directed to a range measuring system for providing a direct binary readout of the range between a measuring station and a remote point. In accordance with the system of the invention, a plurality of binary related signals are also transmitted and then received back at the station upon return from the remote point in order to measure the range between the two. However, with this system it is not necessary to make any phase determination between the transmitted and received signals or convert a phase range determination into a binary digit. Instead, the range to the remote point is read out as a binary number by making a subtraction of the binary numbers on two counters which are respectively controlled by the transmitted and received signals.

In accordance with the invention, a plurality of signals whose frequencies are binary related are produced at the measuring station and transmitted to the remote point to which range is to be measured. These signals are called, for convenience, the reference range bits. Each of these signals operates a binary counter and the counter indicates the respective instantaneous states of the signals by producing a binary 1 or a binary 0 depending upon whether the reference range bit signal is positive or negative, or vice versa. The combined outputs of all the counters produces a binary number which changes at the rate of the highest frequency reference range bit signal. Selected ones or all of the reference range bit signals are transmitted and after reflection or retransmission from the remote point these return signals are received back at the measuring station shifted or delayed in time or phase with respect to the transmitted signals an amount corresponding to the round trip travel time from the measuring station to the remote point. The received signals are used to produce delayed range bit signals, each of which are applied to a respective binary counter. Each counter produces an indication of the state of each delayed range bit and the combined indications of all the counters produces a second binary number. This second binary number differs from the first binary number representing the reference range bit signals by a number count corresponding to the time delay and/or round trip distance between the measuring station and the remote point. The difference between the two numbers is a direct binary numerical representation of the range between the station and the remote point in terms of the number of quarter wavelengths of the highest frequency range bit signal. This binary numerical range representation is produced without any phase measurements or phase determinations and is also produced directly without any analog to digital conversion.

It is, therefore, an object of this invention to provide a range measuring system which produces a direct binary numerical representation of the range between a measuring station and a remote point.

A further object of this invention is to provide a range measuring system in which a plurality of range bit signals are produced at the measuring station, each signal being twice the frequency of the next lowest frequency range bit signal, and in which the range bit signal produced at the station and those which are returned from a remote point are used to operate binary counters.

Yet another object of the invention is to provide a binary range measuring system in which a plurality of binary related signals are transmitted and then returned from a remote point and in which the binary related signals and the returned signals are used to operate binary counters to measure range directly in binary form as the difference between the two numbers indicated by the counters.

Still a further object of the invention is to provide a range measuring system with a direct binary range readout in which the binary range readout is the numerical difference between a first binary number on a counter operated by a first plurality of binary related signals and a second number on a counter operated by binary related signals which are received after reflection or retransmission from the remote point to which range is measured.

Other objects and advantages of the present invention will become more apparent upon reference to the following specification and annexed drawing in which.

Figure 1A:
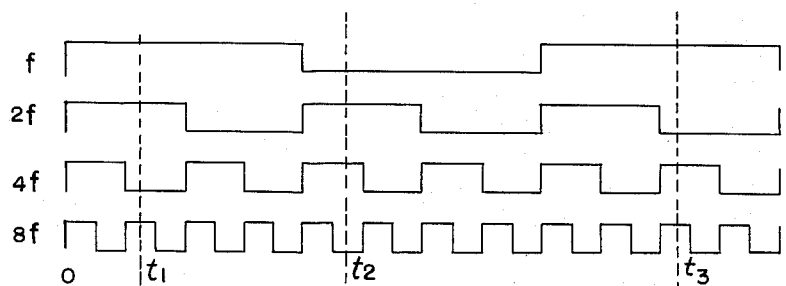
FIGURE 1 is a diagram illustrating certain principles of the present invention.

In order to explain the principles of the invention, reference is made to FIGURE 1A which shows a plurality of reference range bit signals which are for the purpose of explanation, assumed to be transmitted from the measuring station to the remote point to which range is to be measured. These reference range bit signals are preferably subcarriers which are modulated onto a carrier wave of higher frequency and they are shown as being substantially square-wave in form, although they could be sine waves or other type of waveforms. Four reference range bit signals are illustratively shown and these are binary related, that is the frequency of each signal is twice that of the next lower frequency signal. This is indicated by designating the respective signals with frequencies of $f$, $2f$, $4f$, and $8f$. Any suitable number of signals can be used with the present invention so long as the binary frequency relationship $2^n f$ (where $n$ is an integer) between the signals is preserved. The signals of FIG. 1A are preferably synchronized so that at time equals zero or at the end of the cycle of the lowest frequency signal a cycle of each starts and all of the signals start to go positive or negative at that time. Therefore, two complete cycles of the signal having frequency $2f$ occur during one complete cycle of the signal of frequency $f$, two complete cycles of the signal of frequency $4f$ for a signal of frequency $2f$, etc.

Each of the signals of FIGURE 1A is applied to a separate binary type counter which may be, for exmaple, a flip-flop circuit, magnetic core, or other type of bistable counter. If each counter produces a binary 0 output in response to a positive half cycle of its applied signal and a binary 1 output in response to a negative half cycle, or vice versa, then each counter's output is changed from a binary 0 to a binary 1, or vice versa, when the applied signal changes from a positive to a negative half cycle, or vice versa. Therefore, the total binary number produced by all the connected counters is continually changing at the rate of the highest frequency subcarrier signal $8f$ and each counter respectively indicates the state of the the subcarrier applied to it. For example, consider that a positive half cycle of a subcarrier waveform is represented by a binary 0 and a negative half cycle by a binary 1. The counter for the lowest order digit of the binary number, which is the right hand digit in conventional counting binary notation, is supplied with the subcarrier signal $8f$. The output of the $8f$ counter will alternately change from binary 0 to 1 at the same rate and at the same time signal $8f$ changes from positive to negative half cycles. The second counter, which receives signal $4f$, changes binary 0 to 1 at half rate of $8f$ counter while the counter receiving the $2f$ signal changes at half the rate of the $4f$ counter, and the counter receiving the $f$ signal changes at half the rate of the $2f$ counter. Therefore, for every eight counts (a count being considered a 0 to 1 or a 1 to 0 transition) of the $8f$ counter there will be four counts of the $4f$ counter, two counts of the $2f$ counter and one count of the $1f$ counter. The changing count can be indicated by any suitable type of a readout device or else stored for use in other operations such as subtraction in a conventional binary storage register formed by a plurality of magnetic cores, flip-flop circuits, diodes, etc. In some cases the counters themselves may be the storage elements.

The binary numbers present at the output of the counters in response to the signals in FIGURE 1A are shown at three illustrative times $t_1$, $t_2$ and $t_3$ in the chart below FIGURE 1C. Starting with the right hand (lowest order) digit of the binary number and adopting the convention of a binary 0 digit for a positive half cycle of the range bit signal and a binary 1 digit for a negative half cycle, at time $t_1$ the $8f$ counter produces a binary 0 in response to the positive half cycle of the $8f$ signal, the $4f$ counter a binary 1, the $2f$ counter a binary 0, and the $f$ counter a binary 0. This gives the complete binary number 0010. Similarly, the binary number representative of the four range bit signals at time $t_2$ is 1001 and the binary number at time $t_3$ is 0100. The binary number representation of the signals can be formed accordingly at any time and it will have a number of digits which correspond to reference range bit signals used. Of course, the binary relationship of the frequencies of these signals is maintained no matter how many signals are used.

The binary related signals of FIGURE 1A are used to measure range and directly produce a binary number readout in the following manner. It is well known that when a signal is transmitted from a station to a remote point and then reflected or retransmitted therefrom and received back at the station, that there is a time delay or phase shift corresponding to the round trip time for the signal to travel to the remote point and then return. The round trip time T for a subcarrier signal to travel to a remote point and then return to the station is given as:

$$(1) \qquad T = 2\frac{R}{C}$$

Where:
$T$ = round trip time in seconds,
$R$ = one way range from station to remote point in meters, and
$C$ = velocity of propagation of the signal in meters per second.

During the time T there will be number of cycles N of the highest frequency range bit signal given by:

$$(2) \qquad N = Tf_c$$

Where:
$N$ = number of cycles in time T and
$f_c$ = frequency of highest frequency range bit signal in cycles per second.

Since each complete cycle of the signal $f_c$ produces a 1 to 0 and a 0 to 1 transition on its respectively connected counter, then it may be considered that during the time T there are 2N counts. Therefore, the total number of counts B occurring during the time T will be:

$$(3) \qquad B = 2Tf_c$$

If the highest frequency signal $f_c$ is expressed in terms of its respective wavelength $\lambda_c$ by the formula $$(4) \qquad \lambda_c = \frac{C}{f_c} \text{ or } f_c = \frac{C}{\lambda_c}$$

Then by using Equation 4 for $f_c$ and combining Equations 1 and 3, the one way range R may be expressed as a function of the number of counts B so that:

$$(5) \qquad R = \frac{B\lambda_c}{4}$$

Therefore, if the number of counts produced during time T and the frequency (and wavelength) of the highest frequency signal are known, the range R is read out directly as a binary number in terms of quarter wavelengths of the highest frequency subcarrier. Actually, the remote point lies within a range segment of length equal to one quarter of wavelength of the highest frequency signal with the range segment being at a distance given by Equation 5.

As described above, the lower frequency range bit signals also operate their respectively connected counters in time synchronization so that all counters read 1 or 0 at some predetermined time, for example, the beginning of the positive half cycle of the lowest frequency signal $f$. If the range measuring system is operated on a pulse basis so that the count is at zero or some predetermined number at the start of a range measurement, then just the number of counts B of the highest frequency signal would have to be determined on a suitable counter, such as a ring type, between time of transmission of a signal and time of return. In this case the lower frequency range bit signals and their counters would not be needed. While this can be accomplished in several ways including the pulse technique referred to above, it is more practical to transmit range bit signals on a continuous wave (C.W.) basis. Therefore, a first binary number is produced by the counters operated by the reference range bit signals. This first binary number continually changes at the rate of the highest frequency signal and some way must therefore be found to produce the desired count B accurately and without ambiguity.

In order to produce the correct count B for a C.W. system, the delayed range bit signals which are returned from the remote point are also used to operate counters similar to the ones provided for the reference range bit signals. Since each counter is controlled by a respective received but delayed range bit signal, a second binary number is produced corresponding to the received signals. The second binary number produced by this counter is at any instant, behind that produced by the counters for the reference range bit signals by the number of counts B produced in the time T. By subtracting the first and second binary numbers on the counters the number count B, which is the difference of the two numbers, is obtained. The number B represents the range R as previously described and this number changes as the range changes.

In the C.W. system, range measurement ambiguity is prevented by having one or more of the lower frequency range bit signals operate its respectively connected counter rather than using only the highest frequency signal and a ring type counter. One such type of ambiguity which might occur with the ring type counter arrangement is that of maximum range ambiguity.

For example, starting from a zero count the lowest frequency signal $f$ will produce one or no counts depending upon whether the remote point is at a range greater than or less than one-half of the overall range of the system. This can be seen by referring to Equation 2 where if N is less than one-half cycle there will be no count and if N is between one-half to one cycle there will be one count, i.e., 0 to 1 or 1 to 0.

Since there can be only one count produced by the lowest frequency signal counter before there is an ambiguity, i.e., the second count will reset the $f$ counter to its original 1 or 0 condition, the lowest frequency signal $f$ determines the overall range of the system $R_0$ to be one-half the wavelength of the lowest frequency signal, that is two quarter wavelength segments. Therefore, the frequency of the lowest frequency range bit signal should be selected to enable the system to have sufficient range. In a similar manner, the other lower frequency signals $2f$, $4f$, etc., operate their respectively connected counters. While these counters may produce two or more counts during time T, there is no ambiguity since each of these counters merely changes at the rate of the frequency of its respective applied signal which is in turn related to and synchronized with the highest frequency signal. Therefore, in an idealized C.W. system using the present invention it is only necessary to transmit the highest frequency range bit signal to change the counter and provide the range information and also to transmit the lowest frequency range bit signal to resolve any ambiguity. However, in practice the lowest frequency signal and one or two other signals of different frequency are transmitted in order to provide synchronization and the range information corresponding to that produced by the highest frequency range bit signal.

Figure 1B:
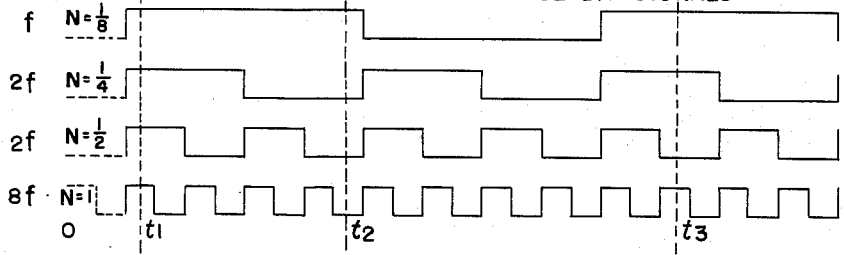

Referring now to FIGURE 1B, a set of received range bit signals is shown after being reflected or retransmitted from a remote point which lies in a range segment equal in length to one-fourth wavelength of the highest frequency signal, with the range segment being at a range R from the measuring station of one-half wavelength (two quarter wavelengths) of the highest frequency signal $8f$. This means that the round trip distance is slightly greater than: one wavelength for the highest frequency signal $8f$ (N=one cycle); one half wavelength for the signal of frequency $4f$ (N=one-half cycle); one-quarter wavelength for the signal of frequency $2f$ (N=one-fourth cycle); and one-eighth wavelength at frequency $f$ (N=one-eighth cycle). The delay for these signals is shown by the dotted lines of FIGURE 1B. Since the remote point lies in a range segment at range R equal to two quarter wavelengths, the round trip time T allows for the production of two counts on the counter for the highest frequency signal. The count difference of two between the number on the counter for the transmitted range bit signal and the counter for the received range bit signals will be maintained so long as the distance R between the measuring station and the remote point stays the same.

When the received signals returned from the remote point are applied to their respective counters, the binary number produced thereby differs from the binary number produced by the counters for the reference range bits by an amount corresponding to the number of half-cycles of the highest frequency subcarrier signal $8f$ that occurred during the round trip time T. Each half cycle of signal $8f$ corresponds to a range of one quarter wavelength for the range segment. For example, the binary number produced by the counters for the received signals of FIGURE 1B at time $t_1$ is 0000. This is different from the binary number 0010 produced by the reference range bit signal counters by the ordinary number two and this corresponds to two quarter-wavelengths of the highest frequency signal, this being the one-way range between the measuring station and the range segment within which the remote point lies. At time $t_2$, when the binary number for the reference range bits is 1001, the binary number for the received signals is 0111 which also gives the same numerical difference of two, providing that the range R is not changed, similarly, at time $t_3$ the reference range bit binary number is 0100 and the received range bit binary number is 0010 still giving the numerical difference of two. Therefore, at any time $t$ the range R is read as the difference of two binary numbers, with the numerical difference corresponding to the number of quarter wavelengths of the highest frequency signal.

Figure 1C:
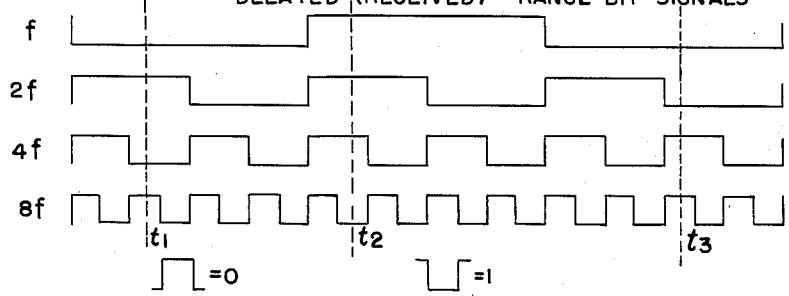

FIGURE 1C shows another series of received range bits. Here, the round trip range between the measuring station and the remote point is four wavelengths (four cycles) of the highest frequency signal $8f$; two wavelengths (two cycles) of the $2f$ frequency signal; one wavelength (one cycle) of the $2f$ frequency signal; and one-half wavelength (one half cycle) of the lowest frequency signal $f$. This corresponds to eight counts of the frequency $8f$ counter, four counts of the frequency $4f$ counter, two counts of the frequency $2f$ counter, and one count of frequency $f$ counter. At time $t_1$ of FIGURE 1C, the counters for the delayed range bit signals produce the binary number 1010 which has a numerical difference of eight when subtracted from the binary number 0010 produced by the counters for the reference range bits. Similarly, at time $t_2$ the counters for the delayed range bits produce the number 0001 which is different by eight from the count 1001 produced by the reference range bit counters. Also, at time $t_3$ the count 1100 on the delayed signal counters is different by eight from the count 0100 for the transmitted signals. The latter two cases assume an end around carry or complement subtraction.

It should be recognized that the numerical difference between the two binary numbers is maintained as long as the range between the measuring station and the remote point remains constant. As the range changes, for example as indicated by the change between FIGURES 1B and 1C, the numerical difference also changes, increasing for increasing range and decreasing for decreasing range. In each case, the numerical difference between the two counters is a direct binary reading which indicates in binary form the one-way range R in quarter-wavelengths of the highest frequency range bit signal. In this manner range to any remote point within the overall range of the measuring system can be read directly as a binary number.

As mentioned before, the maximum unambiguous range of the system is one-half wavelength of the lowest frequency range bit signal. By lowering this frequency the overall system measuring range is increased. On the other hand, the resolution of the system is one-quarter wavelength of the highest frequency range bit signal. Therefore the range measuring resolution may be increased by increasing this frequency, that is, the range segment within which the remote point is located will become smaller. Any number of subcarriers covering any range of frequencies between the highest and lowest may be utilized as long as the unique binary relationship is preserved. This is necessary in order to obtain the direct binary readout.

Figure 2:
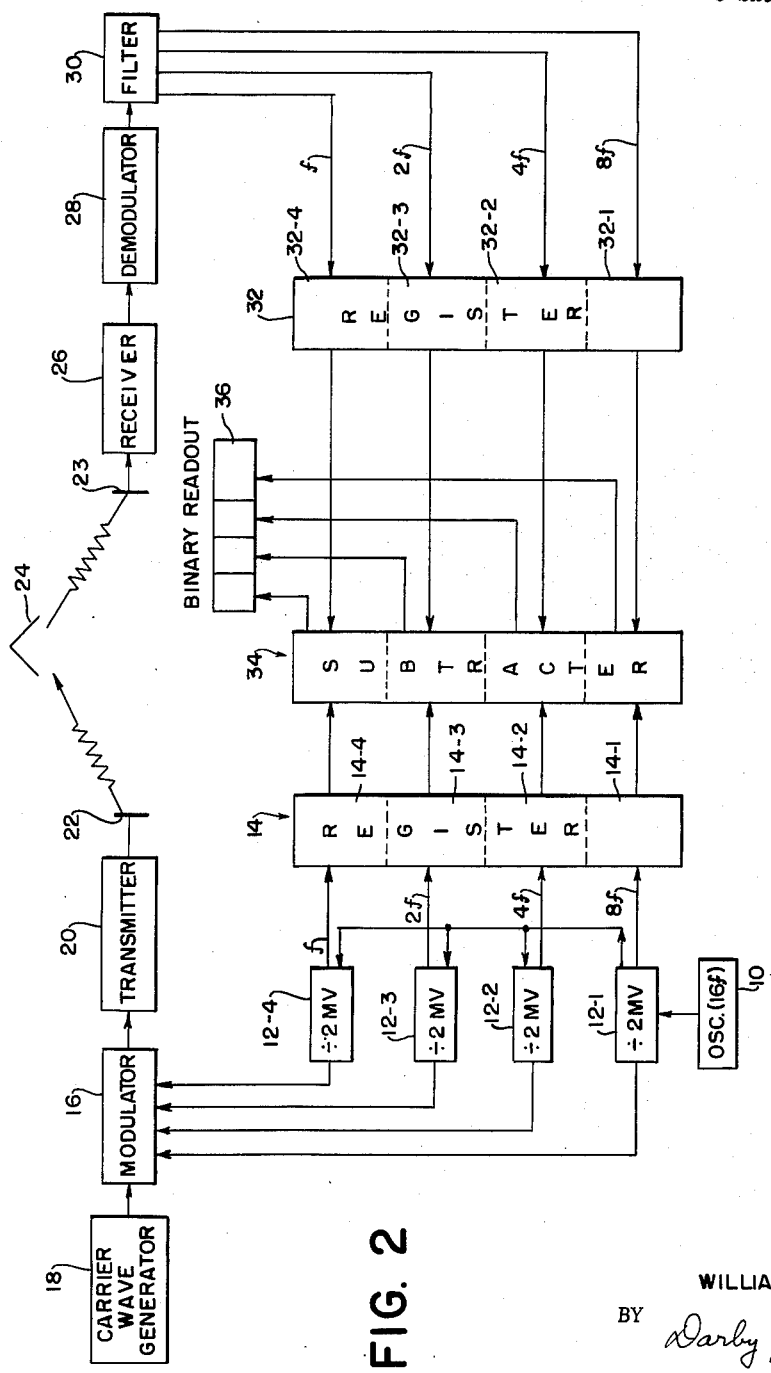
FIGURE 2 is a schematic block diagram of a simplified embodiment of the invention illustrating the operating principles thereof.

FIGURE 2 shows an illustrative embodiment of the invention in which four range bit signals are utilized for measuring range. In this embodiment a master oscillator 10 produces a signal of frequency 16$f$, where $f$ again represents the frequency of the lowest frequency signal. The respective range bit signal frequencies 8$f$, 4$f$, 2$f$, and $f$ are produced by a dividing circuit formed by a number of suitable circuits such as the series connected multivibrators 12–1, 12–2, 12–3, and 12–4. If desired, other dividing circuits may be used, for example, tuned resonant circuits. The –1, –2, –3 and –4 notations correspond to the respective digit (or power of the number two) from right to left in the binary number produced by a counter 14 connected to each multivibrator. Each multivibrator divides the signal it receives by two so that the output of multivibrator-divider 12–1 is a signal of frequency 8$f$, the output of divider 12–2 of frequency 4$f$, the output of divider 12–3 of frequency 2$f$, and of divider 12–8 of frequency $f$. Multivibrator 12–1 also supplies a synchronizing signal to each of the other multivibrators so that all of them operate in synchronism as described with respect to FIGURE 1.

The outputs of the multivibrator dividers 12 are respectively connected to a register 14 which is formed by respective individual counters 14–1, 14–2, 14–3 and 14–4. Each counter 14 may be a suitable device operated in response to the positive and negative going output signals of its respectively connected multivibrator-divider 12. Each counter 14 may also be a storage element which stores the count of its connected divider 12 or, since each multivibrator-divider is actually a counter in itself, the counters 14 of the register may be dispensed with.

The four reference range bit signals produced by the multivibrators 12 are applied to a modulator 16 where they are modulated onto a carrier wave signal of a frequency considerably greater than 8$f$ produced by a carrier wave generator 18. The frequency and nature of the carrier wave signal is dependent upon the type of range measurement being made. For example, where measurements of relatively long ranges are to be made, radio frequency energy is generally used. Where extremely precise measurements are made, light energy, with its relatively short wavelength, can be used. Depending upon what frequencies are used for the carrier wave and the range bit signals, the necessary and proper components are supplied in accordance with the state of the art.

The composite signal of the carrier wave modulated by the plurality of reference range bit signals, which are essentially subcarriers, is applied to a transmitter 20 and transmitted through antenna 22 to the remote point 24. The remote point 24 is illustrated as a reflector but it should be understood that a transponder can be stationed at the point to retransmit the received signal. The signals reflected or retransmitted from the remote point 24 are then received back at the measuring station by an antenna 23. Depending upon the range R between the measuring station and the remote point 24 a time delay T is introduced in the received range bit signals with respect to the reference range bit signals.

The delayed range bit signals received by the antenna 23 are applied to a receiver 26 which has the necessary amplifying, heterodyning, and intermediate frequency amplifier circuits in accordance with the frequencies being used. The output of the receiver's intermediate frequency amplifier, which contains the intermediate frequency carrier signal with all four subcarriers modulated thereon, is applied to a demodulator 28 which removes the intermediate frequency carrier signal and leaves only the four delayed range bit signals. The four delayed range bit signals applied to a filter bank 30 which separates the respective signals of frequencies $f$, 2$f$, 4$f$ and 8$f$ and applies each to a respective counter 32–4, 32–3, 32–2, and 32–1 of a register 32. The counters operate as previously described, namely when the applied delayed range bit signal is positive going a binary 0 is produced and when the signal is negative going a binary 1 is produced. Therefore, the register 32 produces a second binary number which differs from the first number produced by register 14 by a number of counts corresponding to the number of quarter wavelengths of frequency 8$f$ needed to produce range R.

The two binary numbers formed by the counters of the registers 14 and 32 are applied to a subtractor circuit 34. The subtractor may be any of the standard types such as those shown and described on pages 113–128 of the book entitled, "Arithmetic Operations in Digital Computers," by Richards, D. Van Nostrand and Company, Princeton, N.J., 1956, or on pages 281–284 of the book entitled, "High Speed Computing Devices," by Electronic Research Associates, McGraw Hill, New York, 1950, or constructed in accordance with the principles set forth therein. It should be realized that any suitable subtractor may be used and that the type of subtractor used in itself forms no part of the present invention.

The output of the subtractor, which is the difference between two binary numbers, is applied to and operates a binary readout device 36. The binary number on the readout 36 indicates the range R of the range segment, within which the remote point lies, from the measuring station in terms of number of quarter-wavelengths of the highest frequency signal 8$f$. This range can be converted into miles, feet, inches, meters, etc., merely by multiplying the number of difference readout by the distance of a quarter wavelength of the highest frequency signal 8$f$. However, in most cases this conversion is not made since the binary number produced on the readout 36 is used directly for data processing, digital recording, etc.

It should be recognized that the binary number readout is produced directly and without analog to digital conversion. Where more range bit signals are used to increase the overall range of the system and the measuring resolution, the size of the readout 36 is increased accordingly to accommodate the larger binary number produced by the subtraction.

As pointed out before, it is not necessary to transmit all of the reference range bit signals that are used to operate the counters as modulating subcarrier signals on the carrier wave. This is another advantageous feature of the invention since it provides for making precise measurements of high resolution but, at the same time, using only a small amount of bandwidth and relatively low power. The reason for this is that much of the information contained in all of the reference range bit signals is redundant, as far as measuring range is concerned, and the information can be regenerated at the measuring station to operate both the counters for the reference range bits and the delayed range bits. For example, as can be seen in FIGURE 1, it is the final count difference of the number of half cycles of the highest frequency range bit signal that gives the range measurement. If this highest frequency signal is delayed a certain number of cycles during its round trip to and from the remote point, then the next lower frequency range bit signal is delayed only one-half that certain nmber of cycles, the next lower frequency signal one-quarter the number of cycles, and so forth. In each case the delay for a particular range bit signal is one-half that of the next higher frequency signal and twice that of the next lower frequency signal. Therefore, a single range bit signal contains all of the information necessary to make the range measurement and the counters for the reference and delayed range bit signals can be operated by signals which are produced by multiplying and/or dividing this single range bit signal.

In a preferred embodiment of the invention where less than the total number of range bit signals used to operate the counters are transmitted, it is desirable that several range bit signals be transmitted. This prevents the occurrence of any range count ambiguities on the counters, ensures more accurate counter operation, and allows the range measuring system to operate continuously. For example, the lowest order or lowest frequency range bit signal is transmitted in order that there be no range ambiguity in the maximum range of this system. This effect was described previously. Several other higher frequency range bit signals are also transmitted to provide the necessary accuracy for the range measurement and to ensure proper operation of the counters.

Figure 3:
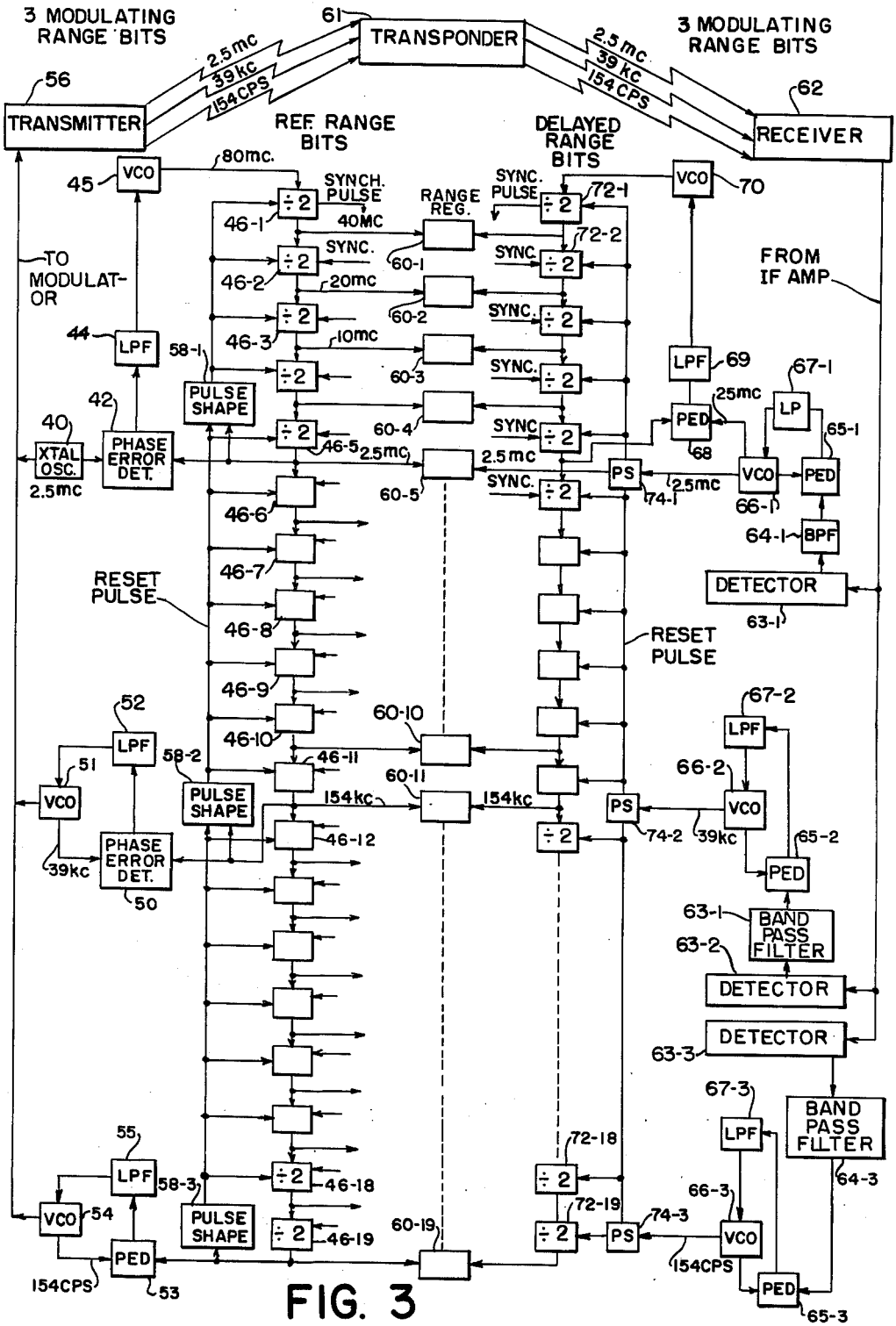
FIGURE 3 is a schematic block diagram of another embodiment of the invention used in conjunction with a transponder located at the remote point.

FIGURE 3 is a block diagram of a system for producing a nineteen bit binary number for the range readout. In this system nineteen reference range bit signals are produced at the measuring station to operate the first set of counters, but only three signals are transmitted. These three range bit signals upon return from the remote point are used to generate nineteen delayed range bit signals, each of which is delayed from a corresponding reference range bit signal of the same frequency by an amount of time T corresponding to the range R from the measuring station to the remote point.

In FIGURE 3, the production of the nineteen reference range bit signals starts in a crystal oscillator 40, which illustratively is shown as producing a frequency of 2.5 megacycles. Oscillator 40 is preferably temperature controlled so that its output frequency is kept stable. While the system of FIGURE 3 is described with respect to using particular frequencies for the various range bit signals, it should be recognized that any suitable frequencies may be utilized, depending upon the maximum range and resolution desired, so long as the binary relationship is maintained.

The output signal of oscillator 40 is applied through a phase and error detector circuit 42 which produces a low frequency error signal of magnitude and polarity depending upon the difference in frequency and phase of a second 2.5 megacycle signal. This record signal is supplied from a divider 46–5 in a manner to be described. The error signal from detector 42 is applied through a low pass filter 44 to a voltage controlled oscillator 45 which operates at a frequency which is a binary multiple of (sixteen times) the frequency of oscillator 40. The error voltage from detector 42 is used to control and maintain the desired frequency for oscillator 45.

The output signal from oscillator 45, which is illustratively at a frequency of 80 megacycles, is divided in half nineteen successive times by a bank of series connected dividers 46–1 to 46–19 which, for example, may be multivibrators. Each of the dividers 46 divides its respective received signal by a factor of two to produce a reference range bit signal so that the output of divider 46–1, which is the highest frequency range bit signal, is 40 megacycles; the output of divider 46–2 is 20 megacycles; the output of 46–3 is 10 megacycles; and so forth. The output of the last divider 46–19 is approximately 154 cycles and all of the divider output signals are binary related. The –1, –2, etc., notations for the dividers 46 correspond to successively lower frequency reference range bit signals and also to the respective order or power of the number two that the range bit corresponds to in the overall binary number. For example, divider 46–1 controls the counter and readout for the righthand bit of the binary number, which is the lowest order binary bit, and divider 46–19 controls the counter and readout for the lefthand or highest order binary bit. The signals from the other dividers control corresponding counters and readouts.

In the system of FIGURE 3 three range bit signals are transmitted. The first of these is the 2.5 megacycle signal produced by the crystal oscillator 40 and which also is present at the output of divider 46–5. These two 2.5 megacycle signals are compared in the phase detector 42 to control the oscillator 45. The second of the signals to be transmitted is produced by taking the output signal from divider 46–11, which is approximately at 39 kilocycles, and applying it to one input of a phase and error detecting circuit 50 whose other input receives the output signal from a voltage controlled oscillator 51. The error detector 50 produces an error signal which is applied back to the oscillator 51 through a low pass filter 52 to lock the frequency and phase of oscillator 51 to the signal produced by divider 46–11. Therefore, oscillator 51 operates in synchronism with the output signal of divider 46–11, which in turn is related to the original 80 megacycle signal produced by the oscillator 45.

In a similar manner, the third and lowest frequency transmitted signal is produced by applying the output signal from the last divider 46–19 in the chain to a phase and error detector 53 which controls a voltage controlled oscillator 54 through a low pass filter 55. This signal is at approximately 154 cycles and it is also directly related in a binary manner to the 80 megacycle signal produced by oscillator 54.

The three signals produced by the respective oscillators 40, 51 and 54 are applied to a transmitter 56 which contains the usual transmitting circuitry, such as a carrier wave oscillator, modulator, power amplifier tubes, and antenna. Conventional amplitude-modulated double or single sideband transmitters can be utilized to transmit these three signals and no further description of this conventional apparatus is necessary. The three range bit signals may, for example, be modulated onto a carrier wave as subcarriers and then transmitted to the remote point.

In order to synchronize the operation of the dividers 46, the 40 megacycle signal from divider 46–1 is used as a synchronizing pulse and it is applied to all the other dividers. The synchronizing pulse operates each of the dividers 46 so that a respective divider can switch its state only upon receipt of or during the time when a synchronizing pulse is applied thereto.

Three pulse shaping circuits 58–1, 58–2 and 58–3 are provided to make all of the counters operated by the divider circuits have the same state and the same binary digit representation at the same instant of time, for example, beginning at the positive half-cycle of the lowest frequency subcarrier produced by divider 46–19. Circuit 58–3 receives the output signal from the last divider 46–19 and operates on the beginning of the positive going half cycle of this waveform to switch all of the dividers 46–12 through 46–19 to the same condition that is, their outputs will also be initially positive going. This means that the counters connected to dividers 46–12 to 46–19 will all read binary 0 the same at this instant of time. In a similar manner, the output of divider 46–11 is supplied to pulse shaping network 58–2, which also receives the output from pulse shaper 58–3. Therefore, the dividers 46–6 through 46–11 are kept in step and commence operation at the same time in response to the signal produced by divider 46–11. Pulse shaper 58–1 receives the output of divider 46-5 to control the dividers 46-1 through 46-4. Therefore, all of the counters are reset to zero at the same instant of time, which is preferably the beginning of the positive half cycle of the lowest frequency signal.

The reference range bit signals produced by divider circuits 46-1 through 46-19 are applied to respective circuits or modules 60-1 to 60-19 of a range register 60. Each module of the range register is formed by a separate counter, subtractor and readout device, such as described in FIGURE 1. Therefore, a nineteen bit binary number and final binary readout can be produced. The function of the range register is to accept the nineteen reference range bits, perform a subtraction with the delayed range bits, and then produce a binary number which is indicative of the range of the measuring station from the remote point.

Each of the range measuring circuits 60 also receives a delayed range bit signal of the same frequency as the applied reference range bit signal. The delayed range bit signals are produced in the following manner. The three reference range bit signals transmitted by transmitter 56 are received at the remote point by a transponder 61 and retransmitted to a receiver 62 at the measuring station. While a transponder 61 is shown, it should be recognized that the system can operate passively and rely upon the reflection of the transmitted reference range bits from the remote point to which distance is measured. For the purposes of explanation it is assumed that the transponder 61 does not introduce any time delay or phase shift into the range bit signals if retransmits. If such delay or phase shift is introduced, it can be compensated for at the receiver 62 or transmitter in a suitable manner since the delay would be constant.

The receiver 62 contains the necessary receiving antenna, amplifiers, intermediate frequency circuits, etc., needed to receive and amplify the retransmitted range bit signals effectively. The output of receiver 62 is applied in parallel to three detectors 63-1, 63-2 and 63-3. Detector 63-1 demodulates the range bit signals from the received carrier wave, or intermediate frequency signal produced by the receiver, and applies it to a bandpass filter 64-1 whose center frequency is approximately at 2.5 megacycles, which is the frequency of the range bit signal at the output of divider 46-5. The output of filter 64-1 is connected to one input of a phase and error detector 65-1, whose other input is supplied from a voltage controlled oscillator 66-1 which operates at a frequency of approximately 2.5 megacycles. The error signal produced by detector 65-1 is applied through a low pass filter 67-1 back to the voltage controlled oscillator 66-1 to keep its phase and frequency the same as the received delayed 2.5 megacycle range bit signal.

The output of oscillator 66-1 is also applied to second phase and error circuit 68 and the error signal from this circuit is applied through a low pass filter 69 to a voltage controlled oscillator 70. Oscillator 70 produces a signal having a frequency of approximately 80 megacycles, and this signal is effectively locked to that produced by oscillator 45. It should be recognized, however, that the signal from oscillator 70 lags the signal produced by oscillator 45, an amount in time T corresponding to the range of the measuring station to the remote point. The output of oscillator 75 is divided successively by a chain of nineteen dividers 72-1 through 72-19 to produce the nineteen delayed range bit signals. The signals at the outputs of these dividers are of the same frequency as the corresponding signals produced by the reference range bit circuits 46-1 through 46-19, but are delayed in time by an amount corresponding to the range. The dividers 72 are also synchronized by pulses applied from the 40 megacycle divider 72-1.

In order to eliminate any possibility of ambiguity and to assure that the counters for the delayed range bits in the range register 60 are operating in step, the lower frequency modulating range bits of 39 kilocycles and 154 cycles per second are demodulated by the respective detectors 63-2 and 63-3. A bandpass filter 54-2 is connected to detector 63-2 to pass the 39 kilocycle signal to a phase and error detector circuit 65-2. The error signal from circuit 65-2 controls a voltage controlled oscillator 66-2 through a low pass filter 67-2. The output signal of oscillator 66-2 is applied to a pulse shaping circuit 64-2. Similarly, the output of detector 63-3 is applied to a bandpass filter 64-3 which separates the low frequency 154 cycle signal and applies it to a phase detector 65-3 and through a low pass filter 67-3 control an oscillator 66-3. The output of oscillator 66-3 is connected to pulse shaper 74-3. If desired, a single detector may be used in place of the three detectors 63.

As in the case with the reference range bit signals and the pulse shapers 58, the pulse shapers 74-1, 74-2 and 74-3 reset all of the delays range bit divider circuits 72 at the same instant of time, for example, the leading edge of the positive half cycle of the lowest frequency delayed range bit signal, which is produced by the oscillator 66-3. In this case, however, instead of taking the signals for the pulse shaping circuits 74 from the dividers, as is done with the reference range bit signals, the signals for the pulse shapers 74 are taken from the respective oscillators 66-1, 66-2 and 66-3. The counters in the range register for the delayed range bit signals will all be reset at the same instant of time and there will be no ambiguity in the count produced. This instant of time is T seconds later than the time the reference range bit counters are reset.

The operation of the circuit of FIGURE 3 is similar in principle to that described with respect to FIGURE 2. In essence, the reference range bit dividers 46 produce a first binary number running count which continues during the transmission of the three range bits. The dividers 72 for the delayed range bits also produce a second binary number running count which is behind that produced by the reference range bits. The count between the two binary numbers differs by a numerical count equal to the number of quarter of wavelengths of the highest frequency range bit signal in the range R. This count difference is displayed on a readout device and instead of having only a four bit readout number as in FIGURE 1, a nineteen bit number is produced. Since the lowest frequency range bit signal utilized is 154 cycles, and the highest frequency 40 megacycles, a relatively fine degree of resolution and large overall range may be obtained with this system.

While the system has been described as operating with radio frequency energy, it should be recognized that energy at microwave and light frequencies may also be used. In the former case, a suitable device such as a klystron or travelling wave tube is used while in the latter instance a laser is used. Of course, the necessary amplifying, dividing and other components for these frequencies are provided. It should also be understood that any number of range bit signals may be used as long as the binary relationship is preserved. This is necessary in order to obtain the direct binary readout.

While preferred embodiments of the invention have been described above, it will be understood that these are illustrative only, and the invention is limited solely by the appended claims.

What is claimed is:

1. A system for measuring the range between a first and a second point comprising at one point: means for producing a first signal, means for transmitting said first signal to the other point, first means responsive to and synchronized by at least a portion of said first signal for producing a continually changing first binary number, means for receiving the transmitted first signal upon return from the other point, and second means responsive to and synchronized by at least a portion of said received first signal for producing a second binary number which is also continually changing, said second binary number differing at any one instant from said first binary number by an amount corresponding to the range between said first and second points.

2. A system for measuring the range between a first and a second point comprising at one point: means for producing a first signal, means for transmitting said first signal to the other point, first means responsive to and synchronized by at least a portion of said first signal for producing a continually changing first binary number, means for receiving the transmitted first signal upon return from the other point, second means responsive to and synchronized by at least a portion of the received first signal for producing a second binary number which is also continually changing, means for comparing the first and second binary numbers to produce a third binary number, said third binary number at any one instant corresponding to the range between said first and second points.

3. A system for measuring the range between a first and a second point comprising at one point: means for producing a plurality of signals whose frequencies are related by powers of the number two, means for transmitting said plurality of signals to the other point, first means responsive to at least one of said plurality of transmitted signals for producing a first binary number, means for receiving the transmitted plurality of signals upon return from the other point, and second means responsive to at least one of the plurality of received signals for producing a second binary number, said second binary number differing from said first binary number by an amount corresponding to the range between said first and second points.

4. A system for measuring the range between a first and a second point comprising at one point: means for producing a plurality of signals whose frequencies are related by powers of the number two, means for transmitting said plurality of signals to the other point, first means responsive to at least one of said plurality of transmitted signals for producing a first binary number, means for receiving the transmitted plurality of signals upon return from the other point, second means responsive to at least one of the plurality of received signals for producing a second binary number, and means for comparing the first and second binary numbers to produce a third number, said third number corresponding to the range between said first and second points.

5. A system for measuring the range between a first and a second point comprising at one point: means for producing a plurality of first signals having respectively different frequencies, the frequency of each first signal being twice that of the signal of the next lower frequency, means for transmitting selected ones of said plurality of first signals to the other point, first means responsive to said plurality of first signals for producing a first binary number, means for receiving the selected transmitted signals upon return from the other point, means responsive to said received signals for producing a plurality of second signals having frequencies corresponding to the frequencies of the plurality of first signals, and second means responsive to said second signals for producing a second binary number, said second binary number differing from said first binary number by an amount corresponding to the range between said first and second points.

6. A system for measuring the range between a first and a second point comprising at one point: means for producing a plurality of first signals having respectively different frequencies, the frequency of each first signal being twice that of the signal of the next lower frequency, means for transmitting selected ones of said plurality of first signals to the other point, first means responsive to said plurality of first signals for producing a first binary number, means for receiving the selected transmitted signals upon return from the other point, means responsive to said received signals for producing a plurality of second signals having frequencies corresponding to the frequencies of the plurality of first signals, second means responsive to said second signals for producing a second binary number, and means for comparing the first and second binary numbers to produce a third number, said third number corresponding to the range between said first and second points.

7. A system for measuring the range between a first and a second point comprising at one point: means for producing a plurality of first signals having respectively different frequencies, the frequency of each first signal being twice that of the signal of next lower frequency, means for transmitting the lowest frequency and at least one other of said plurality of first signals, first counter means responsive to said plurality of first signals for producing a first binary number, means for receiving the transmitted signals upon return from the other point, means responsive to said received signals for producing a plurality of second signals having frequencies corresponding to the frequencies of the plurality of first signals, and second counter means responsive to said second signals for producing a second binary number, said second binary number differing from said first binary number by an amount corresponding to the range between said first and second points.

8. A system for measuring the range between a first and a second point comprising at one point: means for producing a plurality of first signals having respectively different frequencies, the frequency of each first signal being twice that of the signal of next lower frequency, means for transmitting the lowest frequency and at least one other of said plurality of first signals, first counter means responsive to said plurality of first signals for producing a first binary number, means for receiving the transmitted signals upon return from the other point, means responsive to said received signals for producing a plurality of second signals having frequencies corresponding to the frequencies of the plurality of first signals, second counter means responsive to said second signals for producing a second binary number, and means for comparing said first and second binary numbers to produce a third number corresponding to the range between said first and second points.

9. Apparatus at a first location for measuring the range between the first location and a second location comprising: means for producing a plurality of first signals whose frequencies are related by powers of the number two, means responsive to said plurality of first signals for producing a changing first binary number, means for transmitting to the second location signals having a predetermined time relationship with certain of said first signals, means for receiving said transmitted signals upon return from the second location, means responsive to the signals received from the second location for producing a plurality of second signals whose frequencies are related by powers of the number two, and means responsive to said plurality of second signals for producing a changing second binary number.

10. A range measuring system as set forth in claim 9 wherein means are provided to synchronize the plurality of first signals producing the first binary number and means are provided to synchronize the plurality of second signals producing the second binary number.

11. Apparatus as set forth in claim 9 wherein the signals transmitted to the second location have frequencies respectively corresponding to the frequencies of the changing lowest order digit and at least one other changing digit of said first binary number.

12. Apparatus at a first location for measuring the range between the first location and a second location comprising: means for producing a plurality of first signals whose fequencies are related by powers of the number two, means responsive to said plurality of first signals for producing a changing first binary number, means for transmitting to the second location signals having a predetermined time relationship with certain of said first signals, means for receiving said transmitted signals upon return from the second location, means responsive to the signals received from the second location for producing a plurality of second signals whose frequencies are related by powers of the number two, means responsive to said plurality of second signals for producing a changing second binary number, and means responsive to the plurality of first and second signals producing said first and second binary numbers for producing a third binary number which is the difference between said first and second binary numbers.

13. Apparatus as set forth in claim 12 wherein the signals transmitted to the second location have frequencies respectively corresponding to the frequencies of the changing lowest order digit and at least one other digit of said first binary number.

14. A system for measuring the range between a first and a second point comprising at one point: means for producing a first signal, means for transmitting said first signal to the other point, first means responsive to and synchronized by at least a portion of said first signal for producing a continually changing first number, means for receiving the transmitted first signal upon return from the other point, and second means responsive to and synchronized by at least a portion of said received first signal for producing a second number which is also continually changing, said second number differing at any one instant from said first number by an amount corresponding to the range between said first and second points.

15. A system for measuring the range between a first and a second point comprising at one point: means for producing a plurality of signals whose frequencies are related by integral multiples of the power of a number, first means responsive to at least one of said plurality of first signals for producing a first number having a direct numerical relationship to the frequencies of said plurality of first signals, means for transmitting said plurality of first signals to the other point, means for receiving the plurality of transmitted first signals upon return from the other point, and second means responsive to at least one of the plurality of received signals for producing a second number also having a direct numerical relationship to the frequencies of said plurality of first signals, said second number differing from said first number by an amount corresponding to the range between said first and second points.

16. A binary range measuring system for measuring range to a remote point comprising means for producing a plurality of first signals having frequencies which are related to each other by powers of the number two, each said first signal having two states which correspond to the 0 and 1 quantities of a binary digit, first counter means operated by said first signals for producing a first binary number count representative of the states of the respective first signals, means for transmitting selected first signals to the remote point, means for receiving said transmitted first signals upon return from said remote point, said received signals being delayed in time with respect to said transmitted signals by an amount proportional to the range to the remote point, second counter means operated in response to the received signals for producing a second binary number count representative of the states of the received signals, means for producing a binary number count corresponding to the difference between the first and second binary number counts, said last named binary number count being representative of the range to the remote point.

References Cited by the Examiner

UNITED STATES PATENTS

| | | | |
|---|---|---|---|
| 2,947,985 | 8/60 | Cooley | 343—12 |
| 2,949,603 | 8/60 | Logue | 343—12 |
| 3,035,263 | 5/62 | Lader et al. | 343—5 |

CHESTER L. JUSTUS, *Primary Examiner*.

KATHLEEN CLAFFY, *Examiner*.